(12) United States Patent
Chalifoux (10) Patent No.: US 6,263,932 B1
(45) Date of Patent: Jul. 24, 2001

(54) AERIAL TREE HARVESTING APPARATUS

(76) Inventor: Robert Chalifoux, 33 Huntington Crescent, St. Albert, Alberta (CA), T8N 6G4

(*) Notice: Subject to any disclaimer, the term of this patent is extended or adjusted under 35 U.S.C. 154(b) by 0 days.

(21) Appl. No.: 09/580,996

(22) Filed: May 23, 2000

(30) Foreign Application Priority Data

Jun. 10, 1999 (CA) .................................................. 2273818

(51) Int. Cl.⁷ .................................................. A01G 23/095
(52) U.S. Cl. ........................ 144/24.13; 144/4.1; 144/34.1
(58) Field of Search ................................... 144/335, 336, 144/338, 343, 24.13, 34.1, 34.2, 4.1, 21, 176, 237, 218; 30/205, 240; 56/235

(56) References Cited

U.S. PATENT DOCUMENTS

| | | | |
|---|---|---|---|
| 2,707,008 | 4/1955 | Bannister | 144/309 |
| 3,394,744 | 7/1968 | Vit et al. | 144/326 |
| 3,529,642 | 9/1970 | Kamner et al. | 144/34 |
| 3,532,141 | 10/1970 | Kamner et al. | 144/309 |
| 3,536,113 | 10/1970 | Sutherland | 144/309 |
| 3,576,203 | 4/1971 | Cote | 144/3 |
| 3,651,845 | 3/1972 | Propst | 144/3 |
| 3,997,135 | 12/1976 | Peterson | 244/137 |
| 4,121,777 | 10/1978 | Kolstad et al. | 241/58 |
| 4,441,750 | * 4/1984 | Reber | 294/74 |
| 4,662,414 | 5/1987 | Fandrich | 144/335 |
| 4,815,263 | 3/1989 | Hartung et al. | 56/235 |
| 4,984,757 | 1/1991 | Hartung et al. | 244/137 |
| 5,042,727 | 8/1991 | Plante | 244/101.7 |
| 5,305,072 | 4/1994 | Sawada et al. | 356/336 |
| 5,305,972 | * 4/1994 | Hancocks | 144/24.13 |
| 5,445,197 | * 8/1995 | Larsson | 144/336 |

FOREIGN PATENT DOCUMENTS

| | | |
|---|---|---|
| 2044458 | 9/1995 | (RU) . |
| 584823 | 12/1977 | (SU) . |
| 99/53748 | * 10/1999 | (WO) .............................. 144/24.13 |

* cited by examiner

*Primary Examiner*—Ed Tolan
(74) *Attorney, Agent, or Firm*—Christensen O'Connor Johnson Kindness PLLC (57) ABSTRACT

An aerial tree harvesting apparatus includes a first body and a second body having co-axial bores defining a tree receiving opening. The first body is suspended from a hovering aerial craft. The second body is suspended by cables from the first body. Delimbing members are mounted on the second body about the tree receiving opening. The delimbing members sever limbs from the tree when the second body is lowered. A severing saw is movable from a rest position adjacent the tree receiving opening transversely across the tree receiving opening, thereby severing the trunk of the tree positioned in the tree receiving opening once the tree is delimbed. Arms are provided to hold a tree positioned within the tree receiving opening during transport.

10 Claims, 11 Drawing Sheets

FIG. 11

AERIAL TREE HARVESTING APPARATUS

FIELD OF THE INVENTION

The present invention relates to an aerial tree harvesting apparatus.

BACKGROUND OF THE INVENTION

U.S. Pat. No. 2,707,008 which issued in 1955 to Bannister discloses a method and apparatus for harvesting trees using a helicopter. All of the logging operations are controlled from the helicopter, eliminating the need for a ground based logging crew. The Bannister apparatus performed a series of steps sequentially, during which time the helicopter hovered over the tree being harvested. The length of time required to prepare the tree for transport, undermined the financial feasibility of aerial tree harvesting. A form of aerial tree harvesting apparatus using a different concept was developed in Russia and is illustrated in Russian Patent 2,044,458 which issued in 1995.

While helicopters are commonly used in logging operations today, helicopters are merely used as means for transporting logs felled by ground based logging crews. Aerial tree harvesting without the use of ground based felling crews, as envisaged by Bannister, will not become a commercial reality until better aerial tree harvesting apparatus are developed.

SUMMARY OF THE INVENTION

What is required is an improved aerial tree harvesting apparatus.

According to the present invention there is provided an aerial tree harvesting apparatus which includes a first body and a second body having co-axial bores defining a tree receiving opening. The first body has at least one attachment for suspending the first body from a hovering aerial craft. The second body is suspended by cables from the first body. Delimbing members are mounted to the second body about the tree receiving opening. The delimbing members sever limbs from the tree positioned in the tree receiving opening when the second body is lowered. A severing saw is secured to the second body and pivotally movable from a rest position adjacent the tree receiving opening transversely across the tree receiving opening, thereby severing the trunk of the tree positioned in the tree receiving opening. Arms are pivotally secured to at least one of the first body and the second body for movement between a first position spaced apart at a periphery of the tree receiving opening and a second position encroaching upon the tree receiving opening thereby clamping upon a trunk of a tree positioned within the tree receiving opening.

The aerial tree harvesting apparatus, as described above, can rapidly perform all operations necessary to delimb, fell and transport a tree. The apparatus is lowered from a hovering aerial craft, such as a helicopter, until a trunk of a tree is positioned within the tree receiving opening of the second body. As the second body is lowered the delimbing members in the form of either fixed or rotating blades sever limbs from the tree. When the second body has been lowered to just above ground level, the trunk of the tree is severed by passing the severing saw transversely across the tree receiving opening. The arms are activated, preferably by hydraulics, to move them to the second position where they firmly grip the trunk of the tree. The tree does not fall upon being severed, as it is held by the arms and supported from the air by the helicopter. The helicopter then lifts the tree into the air and transports it to a drop off site. The tree is released by returning the arms to the first position spaced apart at the periphery of the tree receiving opening.

Although beneficial results may be obtained through the use of the aerial tree harvesting apparatus, as described above, rather than lowering the helicopter, it is easier to lower the second body relative to the first body. Even more beneficial results may, therefore, be obtained when a cable feed mechanism is provided to decrease or increase the length of the cables to raise or lower the second body relative to the first body.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, an aerial tree harvesting apparatus generally identified by reference numeral 10, will now be described with reference to FIGS. 1 through 11.

Figure 1:
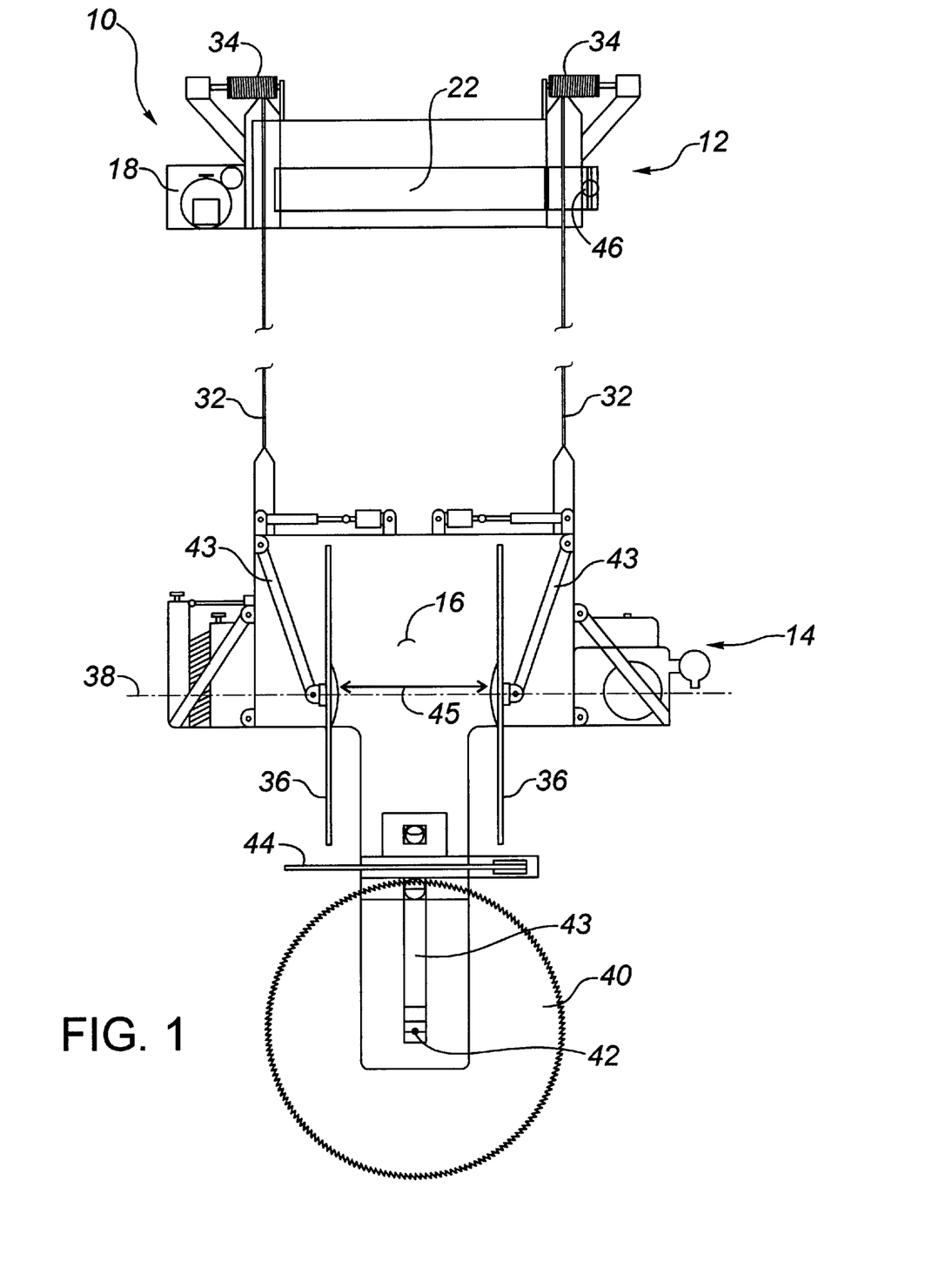
FIG. 1 is a front elevation view, in section, of an aerial tree harvesting apparatus constructed in accordance with the teachings of the present invention.
Figure 2:
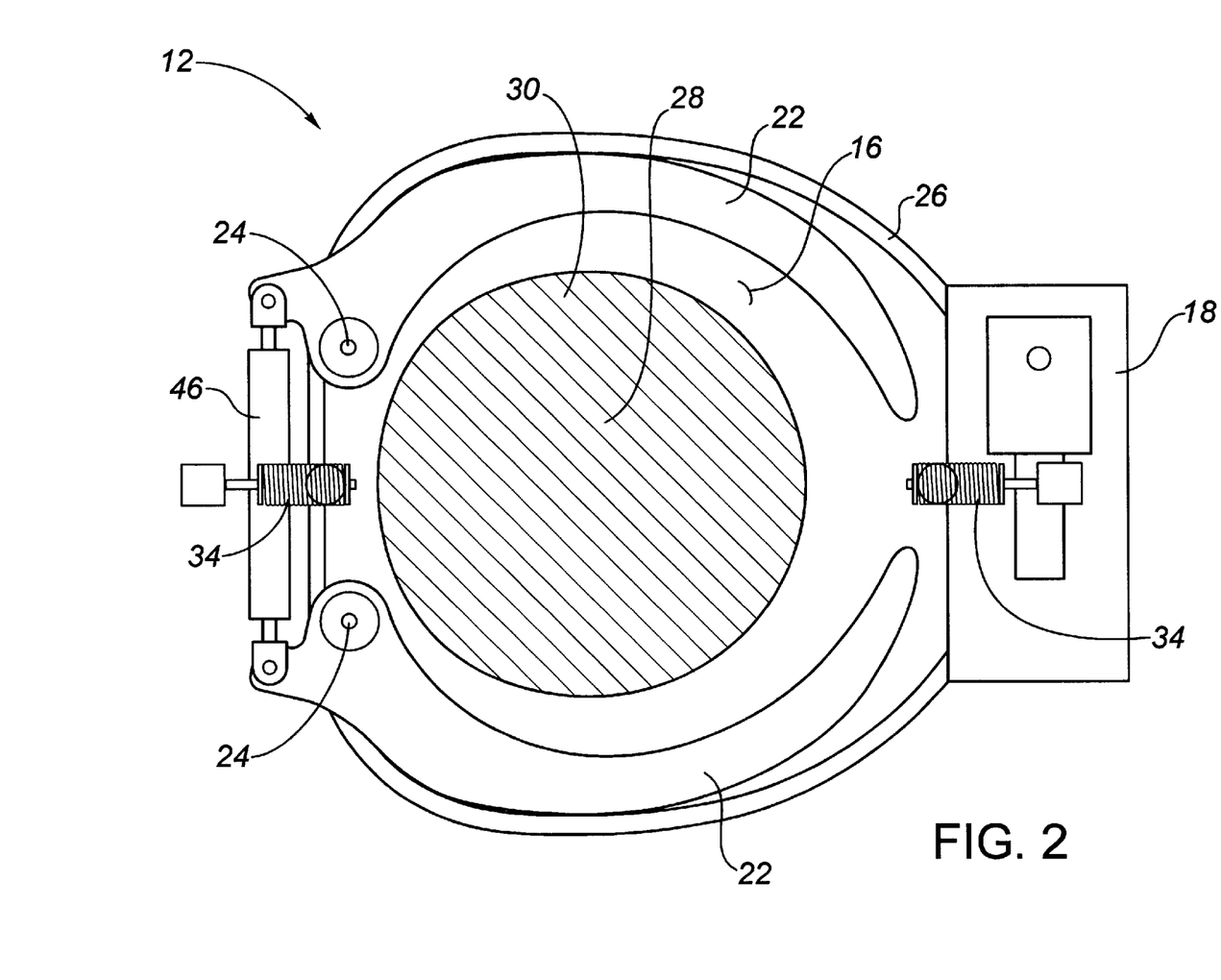
FIG. 2 is a top plan view, in section, of a first body portion of the aerial tree harvesting apparatus illustrated in FIG. 1, with grappling arms in a first position.
Figure 3:
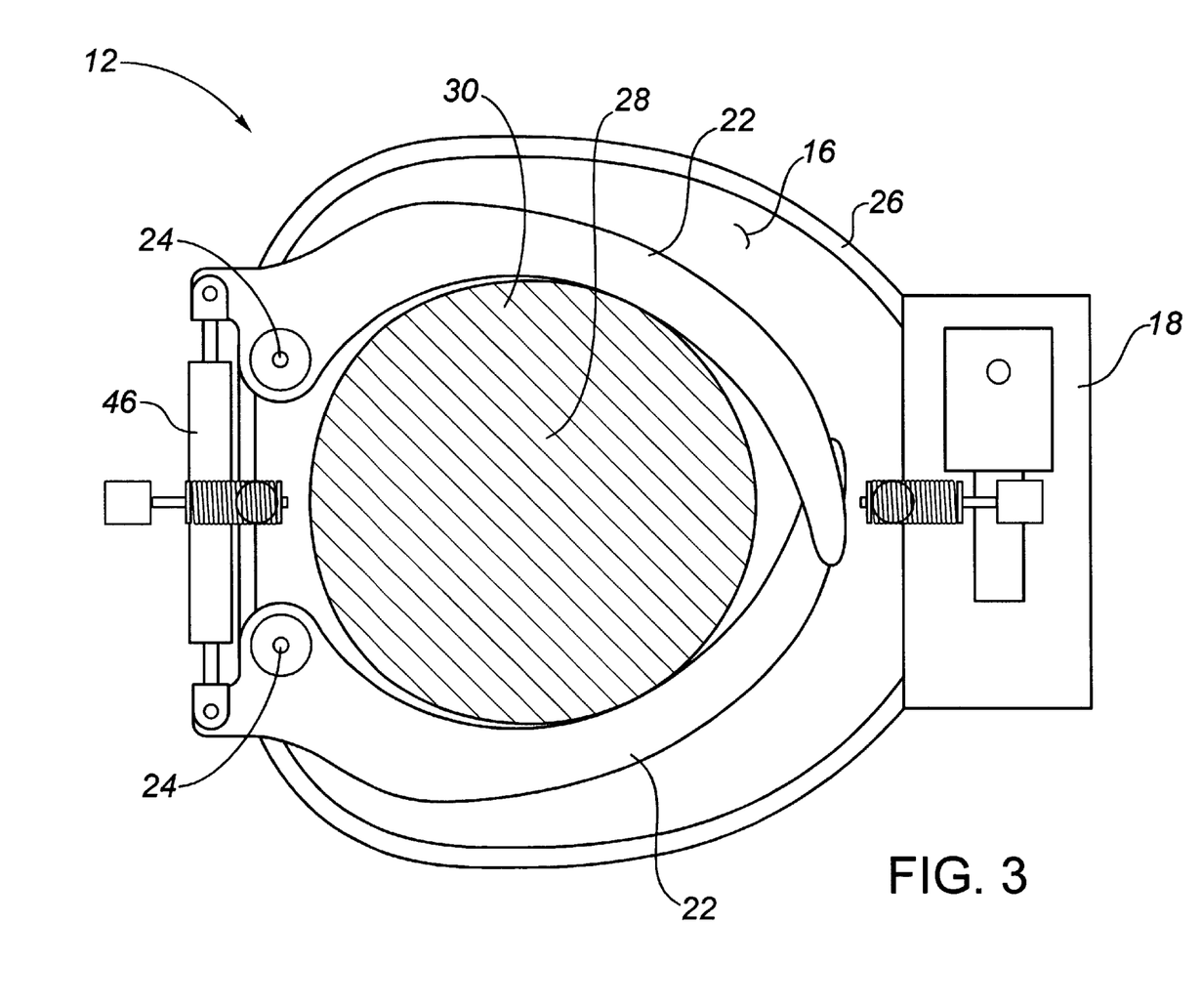
FIG. 3 is a top plan view, in section, of the first body portion of the aerial tree harvesting apparatus illustrated in FIG. 1, with grappling arms engaging a trunk of a tree in a second position.
Figure 6:
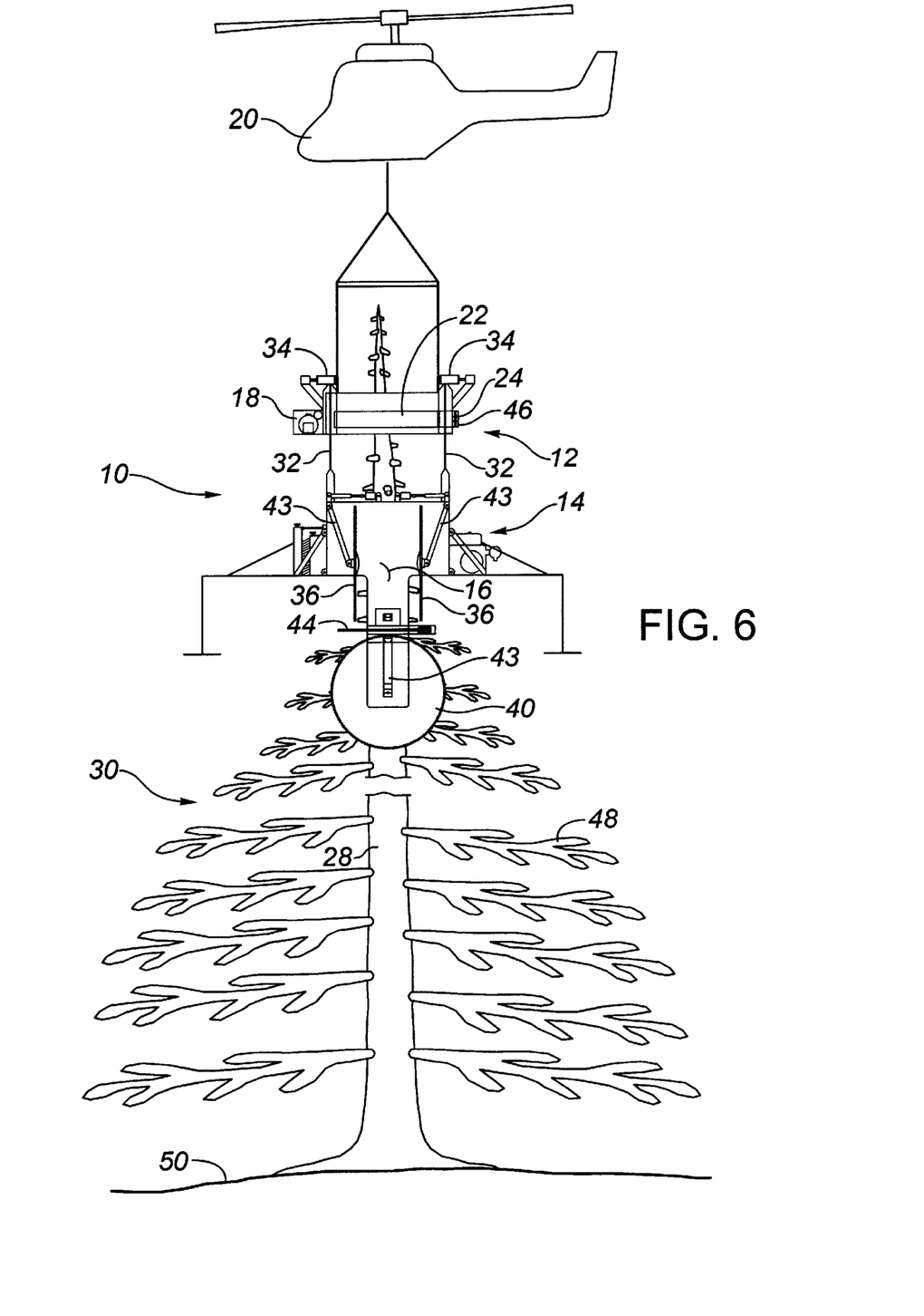
FIG. 6 is a side elevation view, in section, of the aerial tree harvesting apparatus illustrated in FIG. 1, suspended by a helicopter over a tree with the grappling arms engaging the trunk of the tree.

Referring to FIG. 1, aerial tree harvesting apparatus 10 includes a first body 12 and a second body 14 having coaxial bores defining a tree receiving opening 16. Referring to FIG. 6, first body 12 has at least one attachment 18 for suspending first body 12 from a hovering aerial craft, such as a helicopter 20. Referring to FIGS. 2 and 3, grappling arms 22 are each pivotally secured at a pivot position 24 to first body 12 for movement between a first position spaced apart at a periphery 26 of tree receiving opening 16, illustrated in FIG. 2, and a second position encroaching upon said tree receiving opening 16, illustrated in FIG. 3. Referring to FIG. 3, when grappling arms 22 are in second position they clamp upon a trunk 28 of a tree 30 positioned within tree receiving opening 16.

Figure 4:
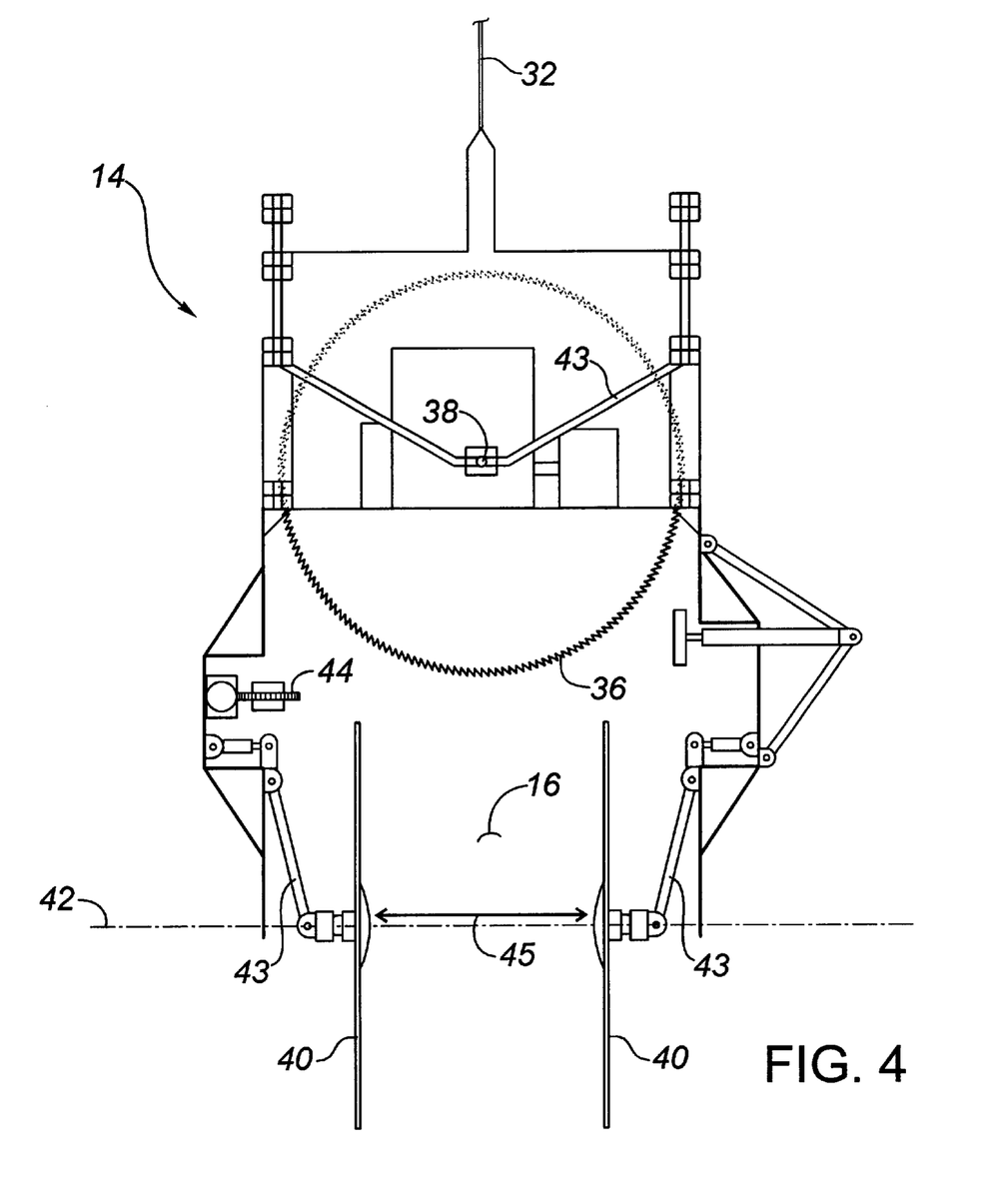
FIG. 4 is a side elevation view, in section, of a second body portion of the aerial tree harvesting apparatus illustrated in FIG. 1.

Referring again to FIG. 1, second body 14 is suspended by cables 32 from first body 12. The length of cables 32 can be decreased or increased by means of a cable feed mechanism. The preferred form of cable feed mechanism has cables 32 wound upon mechanically rotatable spools 34 such that by rotating said spools 34 the length of cables 32 can be decreased or increased to raise or lower second body 14 relative to first body 12. Referring to FIG. 4, a first pair of circular delimbing saw blades 36 is mounted to second body 14 in opposed relation for rotation about a first substantially horizontal axis 38, and a second pair of circular delimbing saw blades 40 is mounted to second body 14 in opposed relation for rotation about a second substantially horizontal axis 42. Second horizontal axis 42 is substantially perpendicular to first horizontal axis 38. Second pair of delimbing saw blades 40 is axially offset along second body 14 from first pair of delimbing saw blades 36, thereby providing sufficient clearance to permit concurrent operation. Each of first pair of delimbing saw blades 36 and second pair of delimbing saw blades 40 is retained in a horizontally spaced relationship by means of positioning arms 43. A separation 45 between either first pair of delimbing saw blades 36, as illustrated in FIG. 1, or second pair of delimbing saw blades 40, as illustrated in FIG. 4, is adjustable between a first position adjacent the periphery 26 of tree receiving opening 16 and a second position narrower than tree receiving opening 16. Separation 45 can be increased or decreased to a desired separation by adjusting the position of positioning arms 43. This adjustment is intended to accommodate differing sizes of trees.

Figure 5:
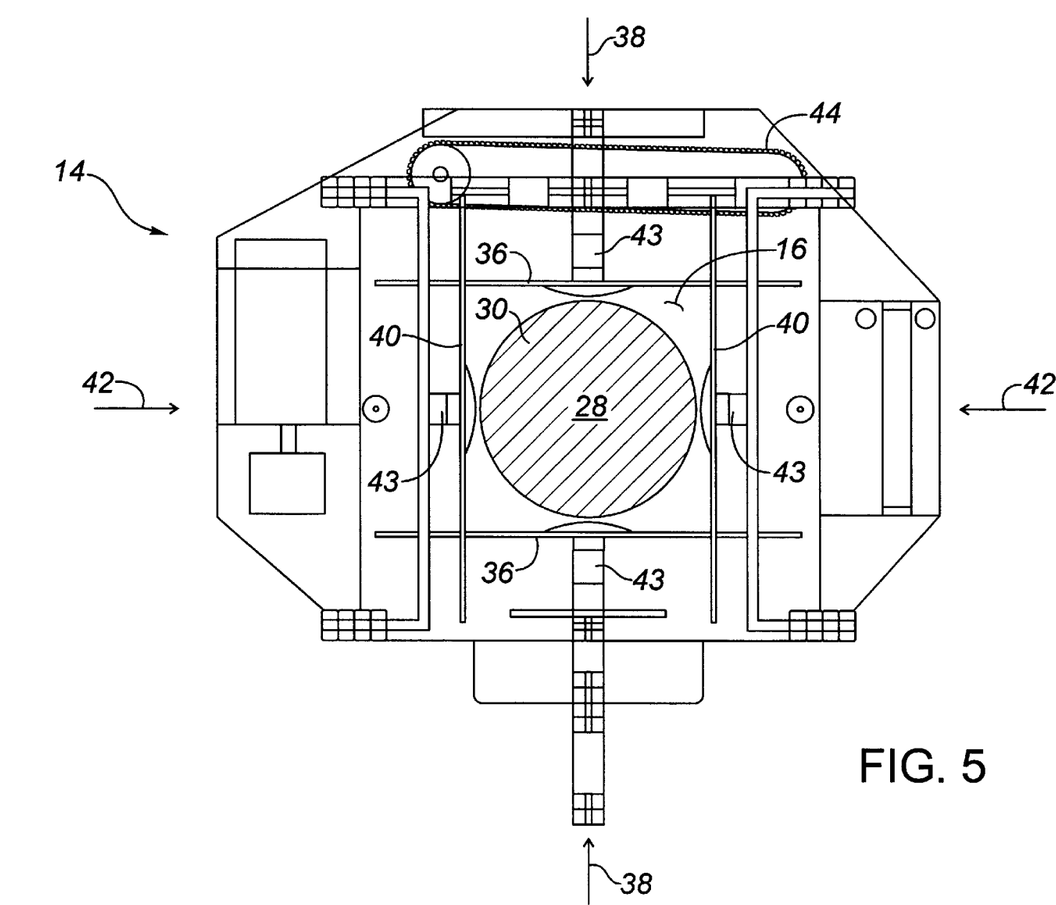
FIG. 5 is a top plan view, in section, of a second body portion of the aerial tree harvesting apparatus illustrated in FIG. 1.
Figure 8:
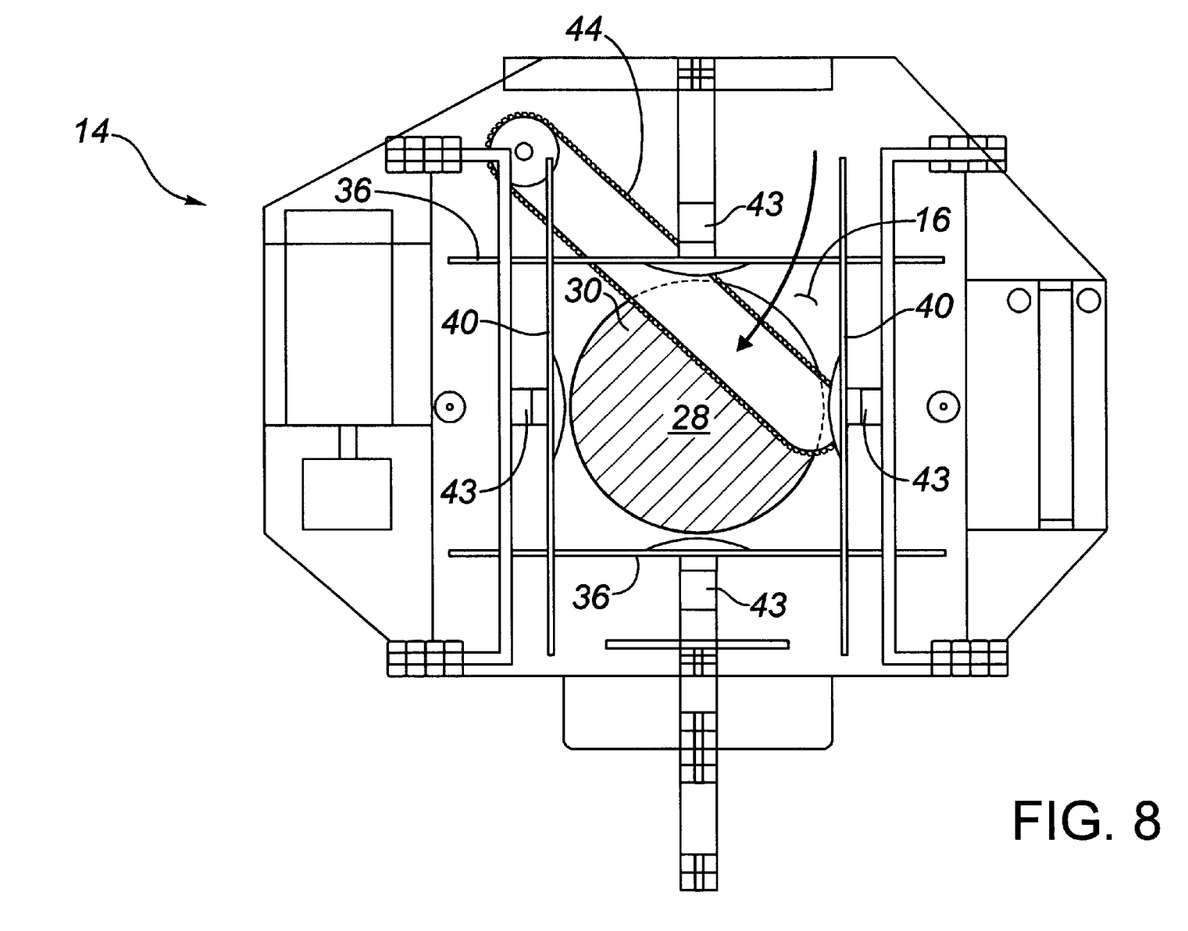
FIG. 8 is a top plan view, in section, of the aerial tree harvesting apparatus illustrated in FIG. 7, with the severing saw in the process of severing the trunk of the tree.

Referring to FIGS. 5 and 8, severing saw 44 is movable from a rest position adjacent tree receiving opening 16, as illustrated in FIG. 5, transversely across tree receiving opening 16, as illustrated in FIG. 8, thereby severing trunk 28 of tree 30 positioned in tree receiving opening 16.

Figure 7:
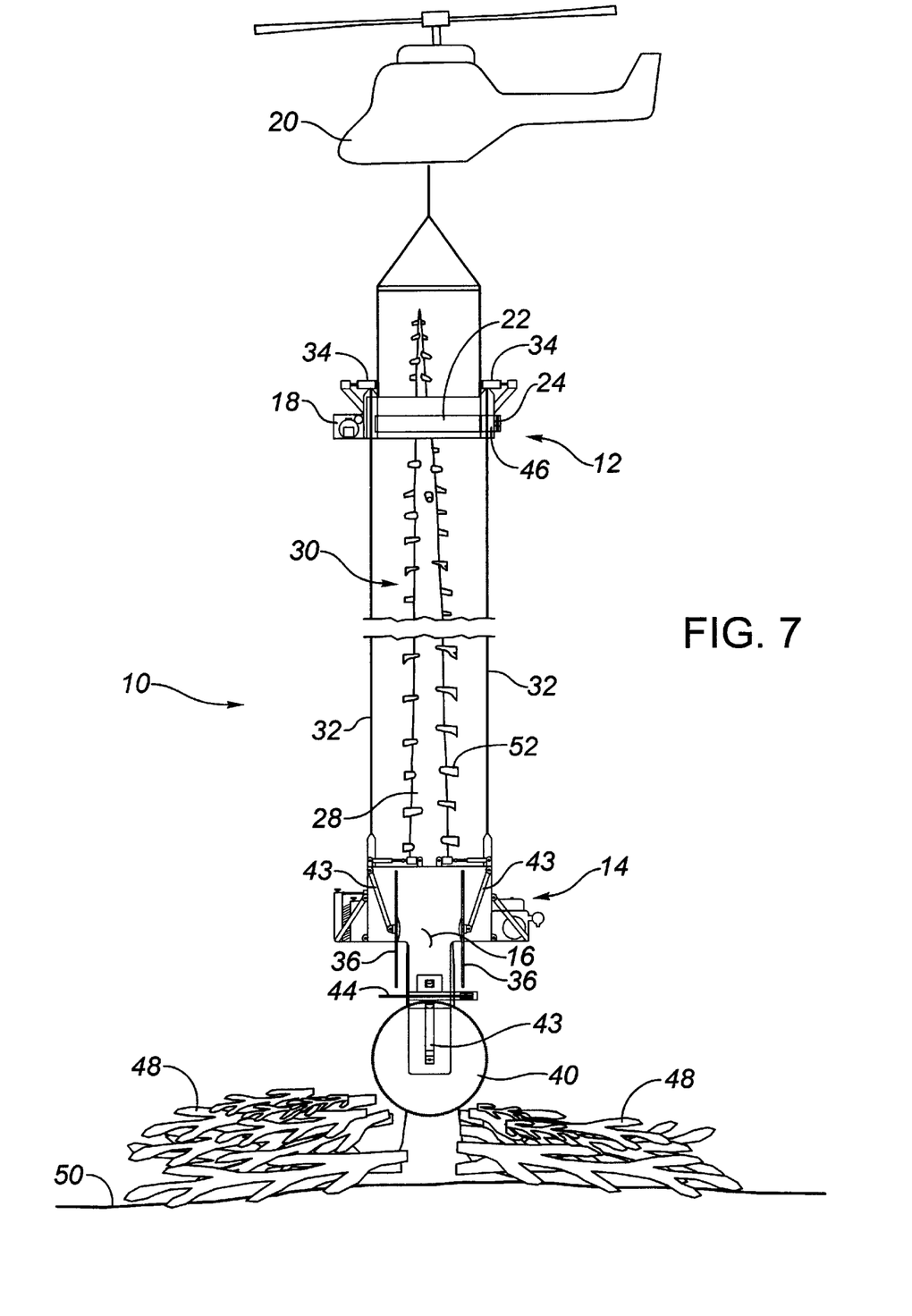
FIG. 7 is a side elevation view, in section, of the aerial tree harvesting apparatus illustrated in FIG. 6, with the second body carrying the circular delimbing saws being lowered on cables from the first body.

Aerial tree harvesting apparatus 10, as described above, can rapidly perform all operations necessary to delimb, fell and transport a tree. Referring to FIG. 6, apparatus 10 is lowered from hovering aerial craft 20, such as a helicopter, until trunk 28 of tree 30 is positioned within tree receiving opening 16 of first body 12 and second body 14. Grappling arms 22, as illustrated in FIGS. 2 and 3, are activated, preferably by hydraulics 46, to move them to second position where they firmly grip trunk 28 of tree 30, as illustrated in FIG. 3. Tree 30 has limbs 48 that must be removed before trunk 28 of tree 30 can be cut. Separation 45 of delimbing saw blades 36, 40 is selected to accommodate the size of trunk 28. Delimbing saw blades 36, 40 are activated and second body 14 is slowly lowered on cables 32. Referring to FIG. 7, as second body 14 is lowered, limbs 48 are severed from trunk 28, leaving a remaining portion 52 that is acceptably small attached to said trunk 28. Tree 30 is delimbed on all sides as first pair of delimbing saws blades 36 and second pair of delimbing saw blades 40 are positioned to encircle trunk 28 of tree 30. Each one of pair of delimbing saw blades 36 and 40 rotates in a different direction so as to maintain second body 14 in balanced equilibrium during cutting.

Figure 9:
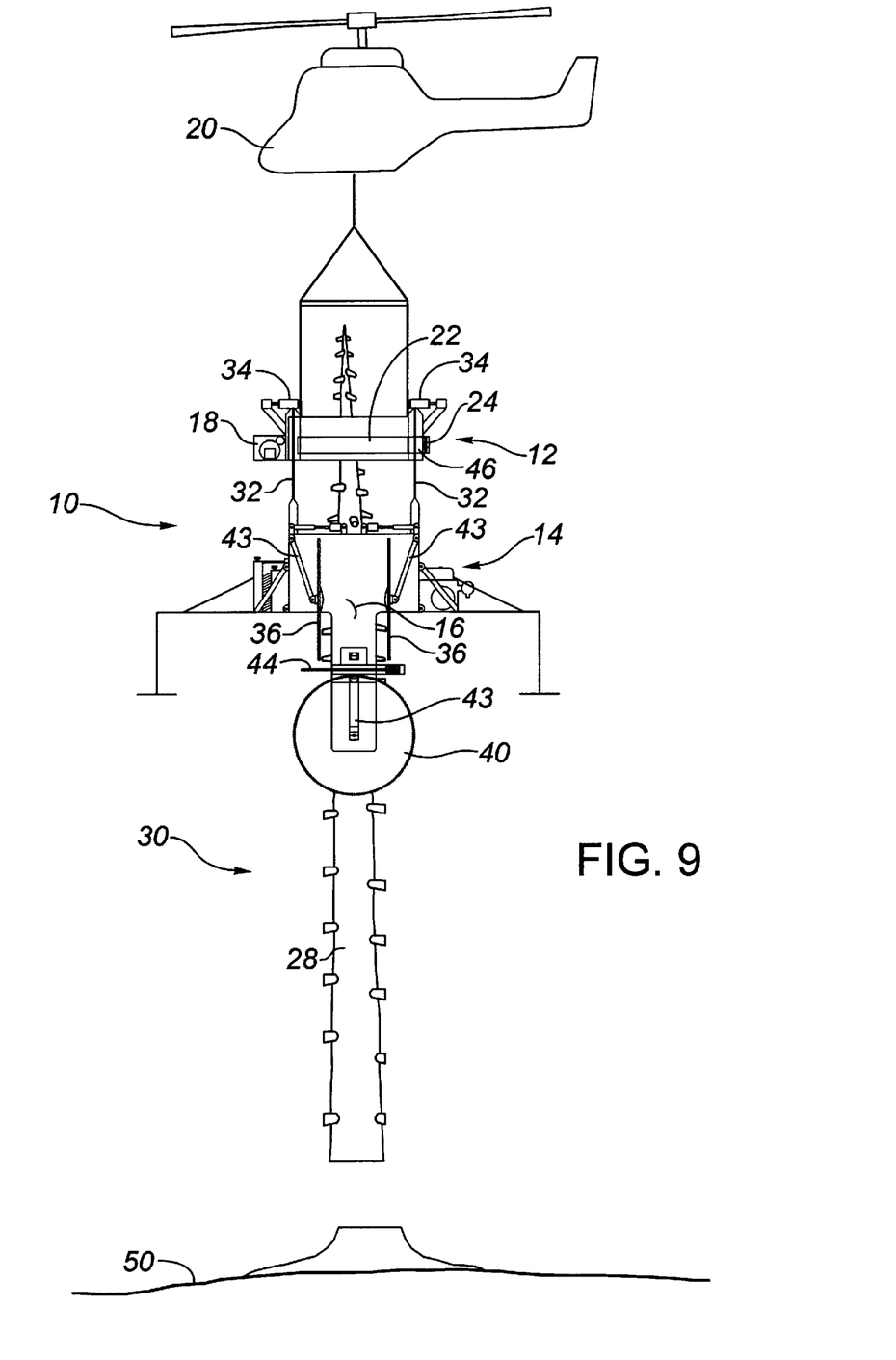
FIG. 9 is a side elevation view, in section, of the aerial tree harvesting apparatus illustrated in FIG. 8, in the process of transporting the tree.

Referring to FIG. 8, when second body 14 has been lowered to just above ground level 50, trunk 28 of tree 30 is severed by passing severing saw 44 transversely across tree receiving opening 16. Tree 30 does not fall upon being severed, as it is held by grappling arms 22 and supported from the air by helicopter 20. Referring to FIG. 9, helicopter 20 then lifts severed trunk 28 of tree 30 into the air and transports it to a drop off site. Second body 14 is raised upon cables 32 to a position immediately adjacent first body 12 during transport. Severed trunk 28 of tree 30 is released by returning grappling arms 22 to first position spaced apart at periphery 26 of tree receiving opening 16, as illustrated in FIG. 2.

Figure 10:
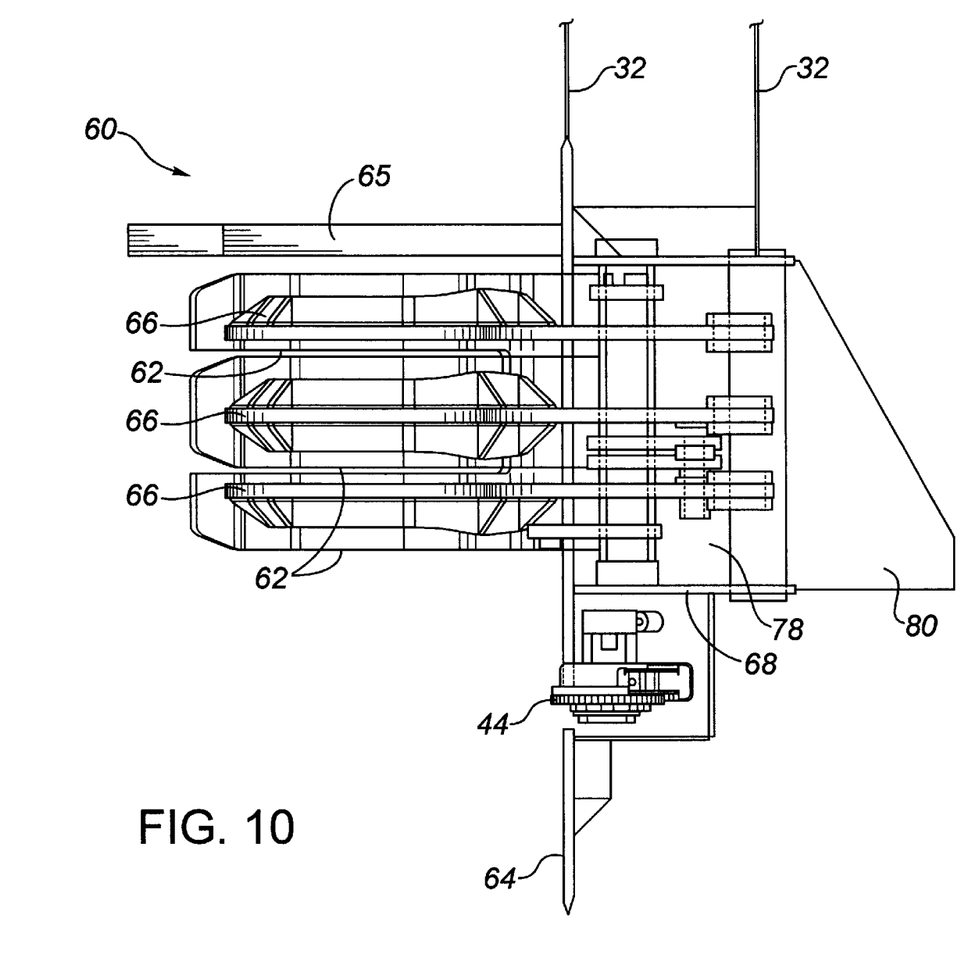
FIG. 10 is a side elevation view of a second body portion of an alternative embodiment of aerial tree harvesting apparatus to that illustrated in FIG. 4.
Figure 11:
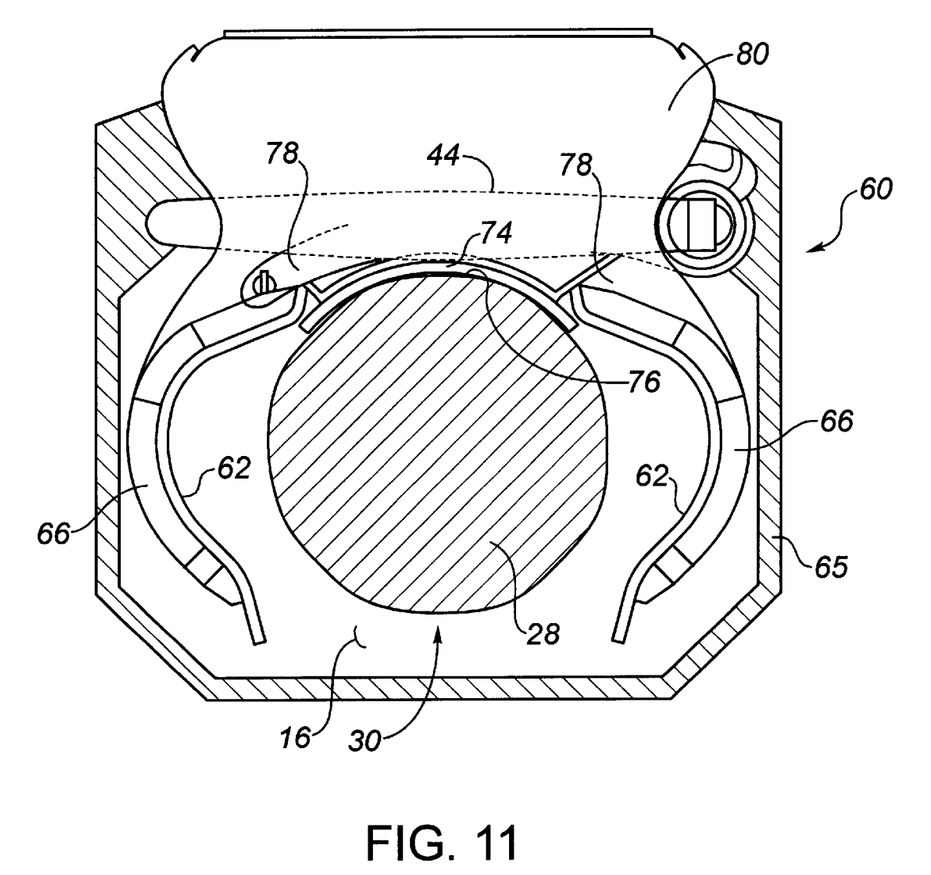
FIG. 11 is a top elevation view of a second body portion of the alternative embodiment of aerial tree harvesting apparatus illustrated in FIG. 10.

When a small helicopter is used for harvesting trees, second body 14 as described above is too heavy to be used for the purpose of delimbing trees. An alternative embodiment has, therefore, been developed for use with smaller helicopters. Referring to FIGS. 10 and 11, an alternative embodiment of second body 60 includes a set of blades or knives 62 instead of circular, drum or chain delimbing saw blades. A containment ring 65 defines tree receiving opening 16 and maintains second body 60 in position about trunk 28 of tree 30. Referring to FIG. 10, knives 62 are vertically spaced within second body 60. Referring to FIG. 11, at least one of knives 62 is positioned on each of the opposed sides of tree receiving opening 16. Trunk 28 of tree 30 is positioned within tree receiving opening 16 with an arcuate portion 74 of second body 60 against a side 76 of trunk 28 of tree 30. The spacing between knives 62 is then adjusted by means of movable knife supports 66, to bring knives 62 as close as possible to trunk 28 of tree 30. Synchronous movement of knife supports 66 is accomplished using an hydraulic mechanism 78 between a spaced apart arrangement to allow entry of a trunk 28 into tree receiving opening 16, as illustrated in FIG. 11, and a cutting position in which knives 62 are spaced a smaller distance from trunk 28. Hydraulic mechanism 78 includes an electric motor which operates an hydraulic pump. Once positioned, knives 62 are maintained in stationary fixed relation to superstructure 68 of second body 60. Second body 60 is suspended on cables 32 from first body 12, in the same manner as illustrated for second body 14 in FIG. 1. Second body 60 is positioned around tree 30, as described, and then dropped rapidly by rapidly lengthening cables 32. Second body 60 falls be virtue of its weight and as it falls knives 62 sever limbs from tree 30. Severing saw 44 is used to cut transversely across trunk 28 to sever trunk 28 after delimbing. Severing saw 44 is hydraulically powered using a combustion engine 80 which runs a hydraulic pump. Referring to FIG. 10, a ground engaging member 64 is provided to maintain second body 60 a set distance from the ground surface.

As described above, aerial tree harvesting apparatus 10 has been illustrated with both stationary blades or movable blades. It is not practical to illustrate every form of movable blades and, for that reason, circular saw blades were selected for purposes of illustration. It will be understood, however, that drum delimbers or chain blades are also workable. Stationary blades could be maintained in a permanently fixed position, but it is preferred that some means of adjustment be provided to accommodate different trunk sizes.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An aerial tree harvesting apparatus, comprising:
   a first body and a second body having co-axial bores defining a tree receiving opening;

the first body having at least one attachment for suspending the first body from a hovering aerial craft;

the second body being suspended by cables from the first body;

delimbing members mounted to the second body about the tree receiving opening, such that the delimbing members sever limbs from the tree positioned in the tree receiving opening when the second body is lowered; and a severing member mounted to the second body, the severing member being movable from a rest position adjacent the tree receiving opening transversely across the tree receiving opening, thereby severing the trunk of the tree positioned in the tree receiving opening; and arms pivotally secured to at least one of the first body and the second body for movement between a first position spaced apart at a periphery of the tree receiving opening and a second position encroaching upon the tree receiving opening thereby clamping upon a trunk of a tree positioned within the tree receiving opening.

2. The aerial tree harvesting apparatus as defined in claim 1, wherein the delimbing members are fixed in a stationary orientation to the secondary body.

3. The aerial tree harvesting apparatus as defined in claim 1, wherein the delimbing members are rotatably mounted to the secondary body.

4. The aerial tree harvesting apparatus as defined in claim 1, wherein the relative positioning of the delimbing members is adjustable.

5. The aerial tree harvesting apparatus as defined in claim 4, wherein the delimbing members are circular saws mounted for rotation about a substantially horizontal rotational axis.

6. The aerial tree harvesting apparatus as defined in claim 1, wherein the severing member is a chain saw.

7. The aerial tree harvesting apparatus as defined in claim 1, wherein a cable feed mechanism is provided to decrease and increase the length of the cables to raise and lower the second body relative to the first body.

8. The aerial tree harvesting apparatus as defined in claim 7, wherein the cable feed mechanism includes mechanically rotatable cable support spools such that by rotating the spools the length of the cables can be decreased to raise and increased to lower the second body relative to the first body.

9. An aerial tree harvesting apparatus, comprising:

a first body and a second body having co-axial bores defining a tree receiving opening;

the first body having at least one attachment for suspending the first body from a hovering aerial craft;

the second body being suspended by cables from the first body, the cables being wound upon mechanically rotatable spools such that by rotating the spools the length of the cables can be decreased or increased to raise or lower the second body relative to the first body;

a first pair of circular delimbing saw blades mounted to the second body in opposed relation for rotation about a first substantially horizontal axis;

a second pair of circular delimbing saw blades mounted to the second body in opposed relation for rotation about a second substantially horizontal axis, the second horizontal axis being substantially perpendicular to the first horizontal axis, the second pair of circular delimbing saw blades being axially offset along the second body from the first pair of circular delimbing saw blades, thereby providing sufficient clearance to permit concurrent operation;

a severing saw secured to the second body and movable from a rest position adjacent the tree receiving opening transversely across the tree receiving opening, thereby severing the trunk of the tree positioned in the tree receiving opening; and grappling arms pivotally secured to at least one of the first body and the second body for movement between a first position spaced apart at a periphery of the tree receiving opening and a second position encroaching upon the tree receiving opening thereby clamping upon a trunk of a tree positioned within the tree receiving opening.

10. An aerial tree harvesting apparatus, comprising:

a first body and a second body having co-axial bores defining a tree receiving opening;

the first body having at least one attachment for suspending the first body from a hovering aerial craft;

the second body being suspended by cables from the first body, the cables being wound upon mechanically rotatable spools such that by rotating the spools the length of the cables can be decreased or increased to raise or lower the second body relative to the first body;

at least two blade supports pivotally mounted to the second body for movement toward and away from each other, whereby the relative spacing between the blade supports is adjusted to accommodate differing sizes of tree trunks;

stationary delimbing blades affixed to the blade supports, such that the delimbing blades sever limbs from the tree positioned in the tree receiving opening when the second body is rapidly lowered relative to the first body;

a severing saw secured to the second body and movable from a rest position adjacent the tree receiving opening transversely across the tree receiving opening, thereby severing the trunk of the tree positioned in the tree receiving opening; and grappling arms pivotally secured to at least one of the first body and the second body for movement between a first position spaced apart at a periphery of the tree receiving opening and a second position encroaching upon the tree receiving opening thereby clamping upon a trunk of a tree positioned within the tree receiving opening.

* * * * *